(12) United States Patent
Piepho et al.

(10) Patent No.: US 6,704,401 B2
(45) Date of Patent: Mar. 9, 2004

(54) SYSTEM OF AND METHOD FOR CONFIGURING AN AUTOMATIC APPLIANCE

(75) Inventors: Allen James Piepho, Windsor, CO (US); Jennifer J. Thayer, Greeley, CO (US); Susie Wee, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 77 days.

(21) Appl. No.: 10/104,426

(22) Filed: Mar. 22, 2002

(65) Prior Publication Data

US 2003/0179867 A1 Sep. 25, 2003

(51) Int. Cl.$^7$ .............................................. H04M 11/00
(52) U.S. Cl. ................................ 379/102.03; 379/90.01
(58) Field of Search ..................... 379/102.01, 102.02, 379/102.03, 102.07, 90.01, 93.17; 370/352

(56) References Cited

U.S. PATENT DOCUMENTS

| | | | |
|---|---|---|---|
| 5,414,756 A | 5/1995 | Levine | 379/67 |
| 5,553,123 A | 9/1996 | Chan et al. | 379/102 |
| 5,600,711 A | 2/1997 | Yuen | 379/102 |
| 5,748,716 A | 5/1998 | Levine | 379/102.03 |
| 5,815,086 A | 9/1998 | Ivie et al. | 340/825.52 |
| 5,915,026 A | 6/1999 | Mankovitz | 380/49 |
| 6,161,133 A | * 12/2000 | Kikinis | 709/220 |
| 6,256,378 B1 | 7/2001 | Iggulden et al. | 379/102.03 |
| 6,415,023 B2 | * 7/2002 | Iggulden | 379/102.03 |

OTHER PUBLICATIONS

"Hewlett–Packard home products– details," [on–line] [Retrieved on: Mar. 4, 2002] Retrieved from: http://products.hp–at–home.com/products/detail.php/ (pp. 1–4).

* cited by examiner

*Primary Examiner*—Stella Woo

(57) ABSTRACT

A configuration server comprises a web server connected to an Internet and hosting a registration webpage accessible to a registrant on the Internet, the registration webpage including an input area receiving configuration information from the registrant, a configuration database connected to the web server for storing the configuration information, and a direct-dial interface connected to a telephone line and to the configuration database, the direct-dial interface operational to answer an incoming telephone call from an automatic appliance and, in response, transmit the configuration information to the automatic appliance. An automatic appliance configuration registration system comprises (a) an automatic appliance including a memory for storing configuration information for automatically configuring the automatic appliance, and (b) a remote configuration server interface operational to answer an incoming call from the automatic appliance and, in response, transmit the configuration information to the automatic appliance, the remote configuration server comprising (i) a web server connected to an Internet and hosting a registration webpage accessible to a registrant on the Internet, the registration webpage including an input area receiving the configuration information from the registrant; and (ii) a configuration database connected to the web server for storing the configuration information.

25 Claims, 3 Drawing Sheets

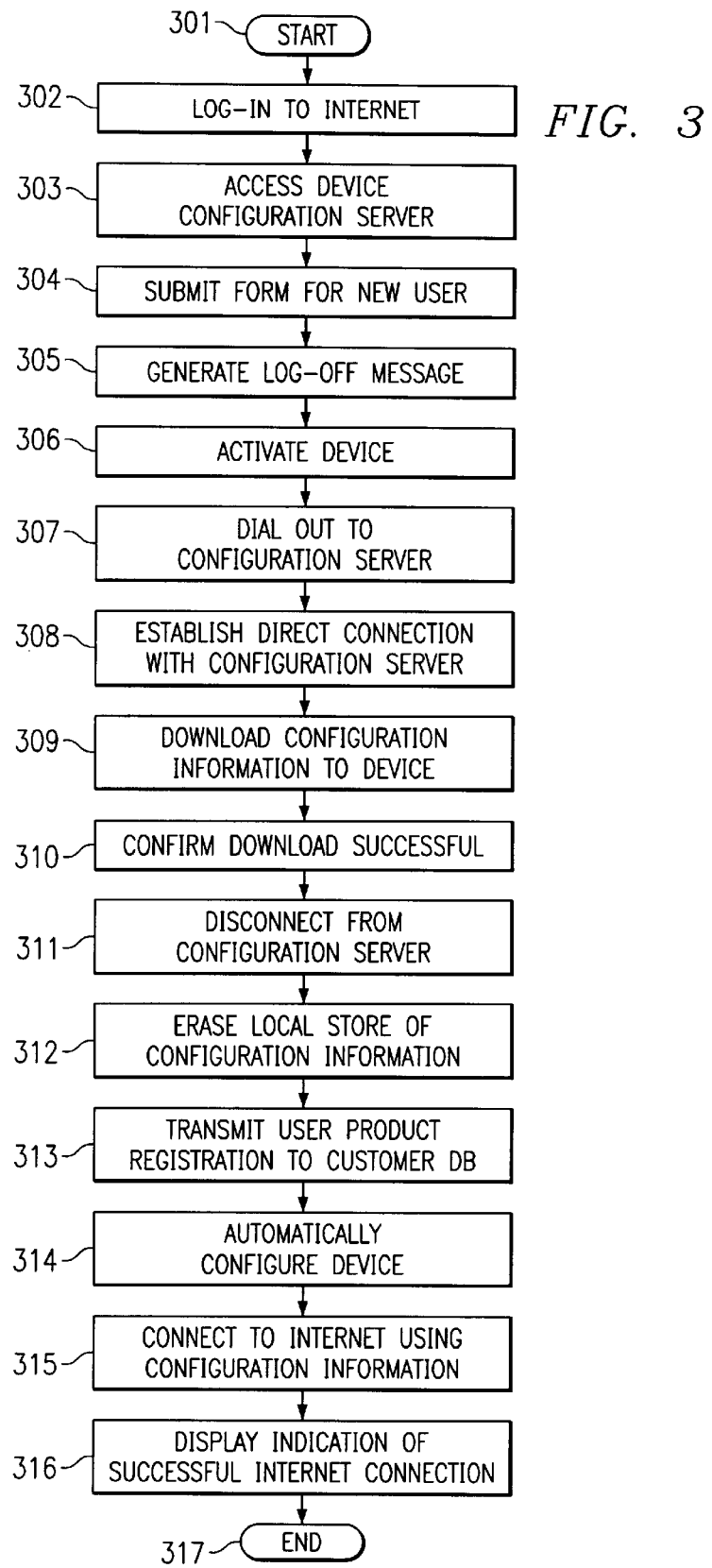

SYSTEM OF AND METHOD FOR CONFIGURING AN AUTOMATIC APPLIANCE

TECHNICAL FIELD

The present invention relates to automatic appliances and similar devices with embedded processors requiring access to the Internet and, in particular, a system of and method for configuring an automatic appliance.

BACKGROUND OF THE INVENTION

Increases in performance and reductions in prices continue to enhance the popularity of personal computers (PCs) in the home and business. Along with PCs, the Internet has provided connectivity between and among computer users at all corners of the world. At the same time, basic functions once only included in full-fledged computers are now incorporated into a wide range of devices which, when provided with access to the Internet, are sometimes called "Internet appliances" or "automatic appliances." While such computing and data access capabilities are available in high-end devices, these capabilities are being increasingly incorporated into greater numbers of devices including home electronics and appliances. For example, in the case of the former, many home entertainment systems are microprocessor-based and include provisions for connecting to various communications networks. Home security systems may include a dialer programmed to dial a central monitoring service upon detection of an event, such as an attempted break-in or fire. Similarly, high-end entertainment systems may include communications facilities for connecting to the Internet.

To enable such automatic appliances to access available communications media such as the Internet, the user must typically configure the appliance with the appropriate settings used to establish communications on the network. In the case of an auto-dialer, a pre-programmed telephone number may be selected so that the appliance may dial-out to an appropriate server or service bureau. However, in the case of more complex networks such as the Internet, a greater amount of data may be required to provide information concerning, for example, Internet Service Provider (ISP) identity (e.g., IP address of the ISP server), user account information (e.g., name, e-mail address, password, etc.), communications type and protocol (e.g., dial-up "Plain Old Telephone Service" (POTS) connectivity, broadband Digital Subscriber Line (DSL), cable modem, etc.) and other parameters used to connect with the Internet. Typically, this information may be input by the user using a remote control device, the automatic appliance itself having no keyboard. Using the remote control, the user often connects a monitor such as a television to the automatic appliance and steps through a hierarchical menu of selections to configure the appliance. This may be often an error-prone and tedious process.

SUMMARY OF THE INVENTION

Accordingly, a need exists for a simple and error-free method and system for initializing and/or configuring an Internet or automatic appliance.

According to one embodiment of the present invention, a configuration server comprises a web server connected to an Internet and hosting a registration webpage accessible to a registrant on the Internet, the registration webpage including an input area receiving configuration information from the registrant, a configuration database connected to the web server for storing the configuration information, and a direct-dial interface connected to a telephone line and to the configuration database, the direct-dial interface operational to answer an incoming telephone call from an automatic appliance and, in response, transmit the configuration information to the automatic appliance.

According to another embodiment of the present invention, an automatic appliance configuration registration system comprises (a) an automatic appliance including a memory for storing configuration information for automatically configuring the automatic appliance, and (b) a remote configuration server interface operational to answer an incoming call from the automatic appliance and, in response, transmit the configuration information to the automatic appliance, the remote configuration server comprising (i) a web server connected to an Internet and hosting a registration webpage accessible to a registrant on the Internet, the registration webpage including an input area receiving the configuration information from the registrant; and (ii) a configuration database connected to the web server for storing the configuration information.

According to another embodiment of the present invention, an automatic appliance comprises a first communication interface configured to establish data communications with a remote server on a first communications network to receive configuration information, a memory configured to receive and store the configuration information, and a second communication interface made operational in response to the configuration information for providing access to a second communications network.

According to yet another embodiment of the present invention, a method of configuring an automatic appliance comprises receiving configuration information from a client, storing the configuration information in a memory, accessing the memory with the automatic appliance operating in an initialization mode, downloading the configuration information from the memory to the automatic appliance operating in the initialization mode, automatically configuring a communications interface of the automatic appliance with the configuration information, and connecting to a remote server with the communications interface.

BRIEF DESCRIPTION OF THE DRAWINGS

FIG. 3 is a flowchart of a method of configuring an automatic appliance according to an embodiment of the invention.

DETAILED DESCRIPTION

A preferred embodiment of the present invention avoids user programming of an automatic appliance using the typically limited capabilities supported by the appliance itself in the form of panel-mounted input switches and/or a remote control device. Instead, a user may input required configuration information using, for example, a Personal Computer (PC) connected to the Internet. With the PC the user accesses a web site and uploads required configuration information to a remote server. After the configuration information is uploaded, the automatic appliance operating an initialization mode accesses the remote server using, for example, a preprogrammed 800 telephone number, and downloads the configuration information. The configuration information may be used by the automatic appliance to configure itself and, for example, obtain communication access to the Internet via an appropriate Internet Service Provider (ISP).

Figure 1:
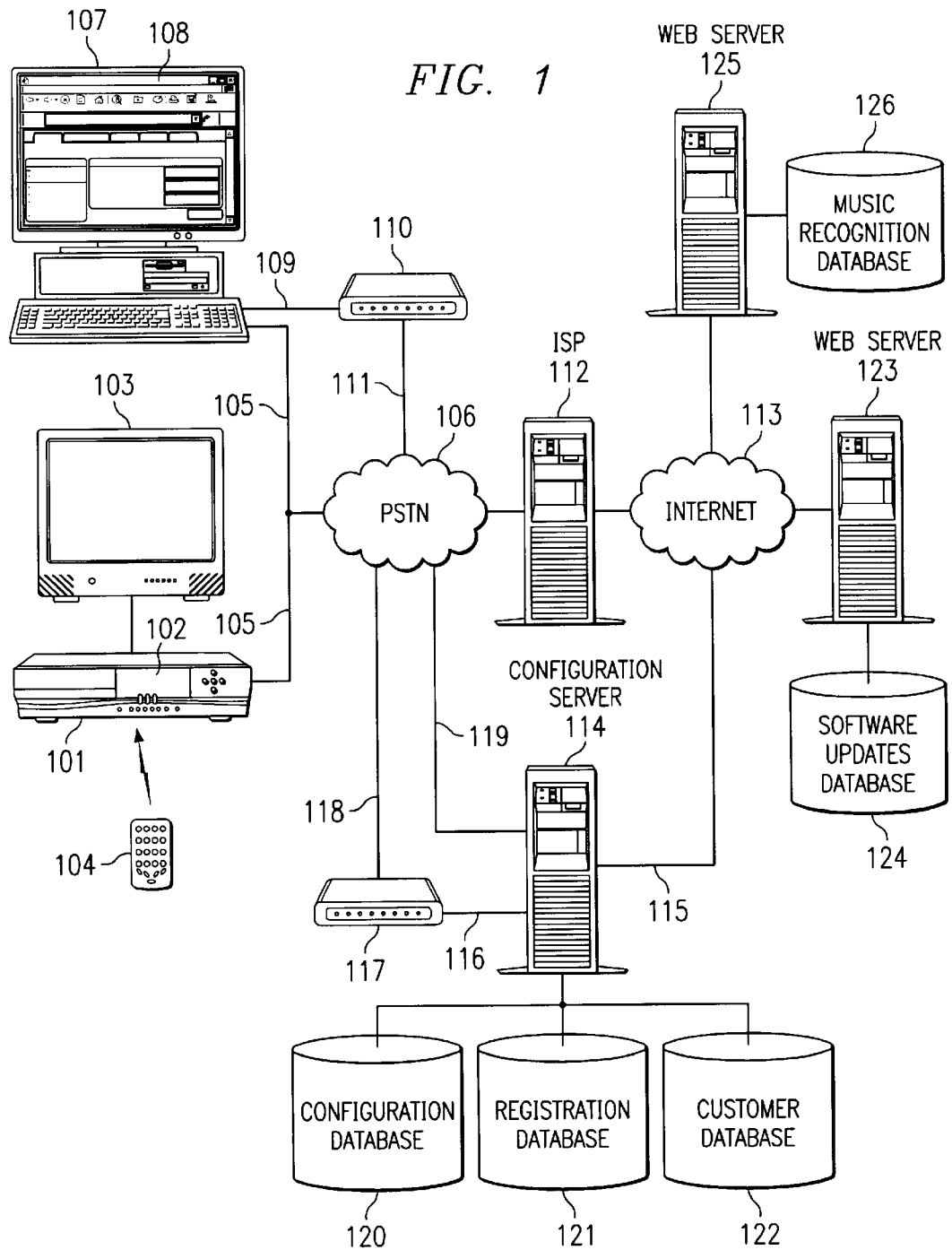
FIG. 1 is a block diagram of a registration and configuration system supporting initialization configuration and operation of an automatic appliance according to an embodiment of the invention.

Referring to FIG. 1, an automatic appliance 101 may include, for example, the Hewlett Packard Company (HP) de100c Digital Entertainment Center or "DEC". Considered a prototype of future consumer music appliances and other types of Internet and automatic appliances, DEC focuses advanced computing power on its purpose as a single-function appliance. In DECs current embodiment it is an advanced network connected juke box. DEC may be a stand-alone appliance, including facilities to enable downloading from the Internet both music and data relating to music (e.g., artist information, lyrics, etc.) contemporaneously and/or previously stored on the system. The system further enables viewing of information about the current track and artist as downloaded from an Internet-accessible music recognition service having an appropriate music information database. The system further includes facilities for including play lists, organizing a music collection, locating Internet radio stations and setting up radio favorites. A front-panel vacuum florescent display (VFD) readout enables use of the system without turning on or connecting it to a TV. Thus, in normal use, the system functions in a stand-alone mode. The user may also interact with the system using an infrared remote control device in addition to front panel mounted controls.

DEC includes a processor, memory and a hard drive, a telephone modem, various data ports, and video and audio input and outputs. Also included may be integral alphanumeric display 102 comprising a front-panel VFD. One of the video interfaces may be used to connect television monitor 103 to provide enhanced display capabilities, such as for reviewing play lists and viewing video media playable on or downloaded to automatic appliance 101. DEC further includes a Compact Disc (CD) player, which reads and plays back audio recorded in a Pulse Code Modulation (PCM) format and digital music in a Moving Picture Experts Group Audio Layer 3 format (MP3) using a standard perceptual coding technique for compressing audio information.

Note that, although DEC maybe used in the present description of an embodiment of the present invention, it may be but one example of an appliance that may take advantage of the present invention.

Automatic appliance 101 preferably connects to dial-up telephone line 105 of a switched telephone network (e.g., the public switched telephone network or "PSTN") via an internal "telephone line" type modem (not shown), supporting standard POTS dial modem protocols, including the BELL, CCITT, ITU-T, and CCITT/ITU-T protocols. In addition, the Ethernet port (not shown) may be used to connect to a broadband media via an appropriate modem to provide broadband connectivity using, for example, DSL, cable modem, TI etc.

Dial-up telephone line 105 provides connectivity to Public Switched Telephone Network (PSTN) 106. Also connected to dial-up telephone line 105 may be PC 107 used by a registrant to access and display registration web page 108. In addition to dial-up telephone line 105, PC 107 may also be provided with broadband connection 111, such as DSL, using ethernet 109 to connect to DSL modem 110. Broadband connection 111 may be routed through switching facilities of PSTN 106 to an appropriate router or gateway to provide direct connectivity with a packet switching network such as the Internet.

PSTN 106 connects to ISP 112 to provide dial-up access to Internet 113. In addition, PSTN access may also be provided via telephone lines or trunks 118 to configuration server 114 via modem bank 117 and ethernet connection 116 or similar data connection. Alternatively, other forms of connectivity between PSTN 106 and configuration server 114 may be provided as represented by connection 119 including, for example, Integrated Services Digital Network (ISDN), DSL, and other interfaces compatible with dial-up access of configuration server 114. Thus, one portion of configuration server 114 comprises dial-up capabilities supported by an appropriate communications interface in the form of a direct-dial interface. The direct-dial interface supports appropriate dial-up modem protocols, including the aforementioned BELL, CCITT, ITU-T, and/or CCITT/ITU-T protocols. Further access may be provided to configuration server 114 via connection 115 to Internet 113. Configuration server 114 hosts a registration web page available via connection 115 to users of Internet 113. In addition, configuration server 114 includes multiple databases, including, for example, configuration database 120, registration database 121, and customer database 122. Configuration database 120 includes information for a particular automatic appliance to gain access to a packet switching network such as the Internet including, for example, ISP identity (e.g., IP address) account information of the user, (e.g., name, e-mail address, account number, etc.). Configuration database 120 may also include technical information about automatic appliance 101 based on serial number. Configuration database 120 may also include ISP-required parameters for Internet usage accessible by ISP name so that a user may merely identify their ISP rather than supply specific configuration details. Thus, technical information to configure, update, and maintain automatic appliance 101 may be keyed to serial number information within configuration database 120. Registration database 121 stores user- or registrant-provided information typically requested by a manufacturer from a consumer. The registration information may include, for example, purchaser name, address, e-mail address, telephone number, make, model and serial number of device purchased, etc. This information may then be used to update customer information stored in customer database 122.

In addition to providing access to a web server function of configuration server 114 by PC 107, Internet 113 further provides connectivity to a host of resources in support of automatic appliance 101. For example, connectivity may be provided to web server 123 providing access to software update database 124 used to download software to automatic appliance 101. Web server 125 represents other facilities including music recognition services providing access to music information database 126. This data may be used by automatic appliance 101 to supplement entertainment media resident on or downloaded to the appliance. For example, artist information contained in music information database 126 may be automatically downloaded to automatic appliance 101 in response to ripping of a Compact Disk (CD) to an MP3 file. Thus, the artist information may be downloaded and associated with the MP3 file at the time of conversion from the CD Pulse Code Modulation (PCM) format to the MP3 format.

Figure 2:
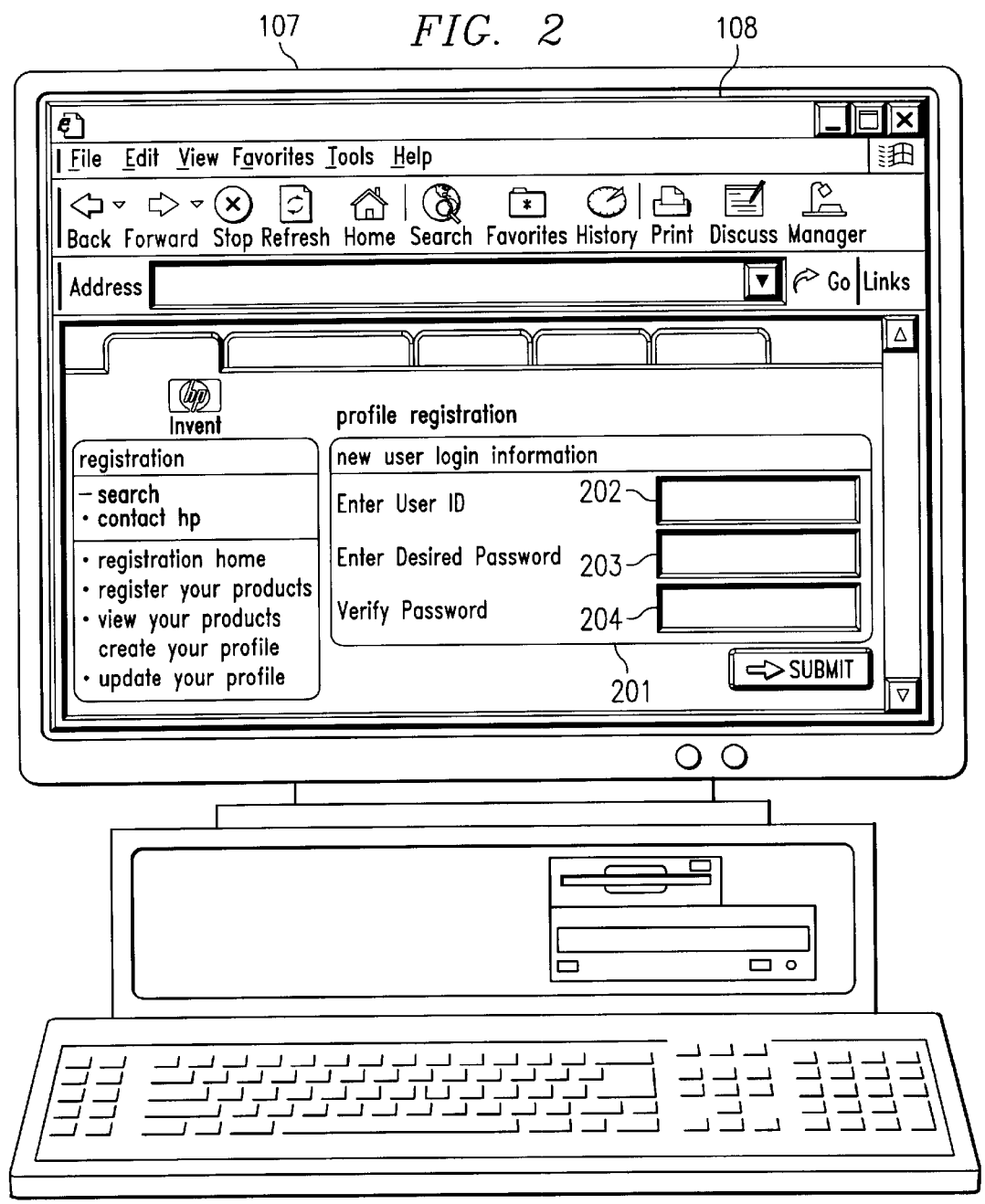
FIG. 2 is a screen presentation representative of a browser displaying a registration form used to provide configuration information to a configuration server according to an embodiment of the invention.

PC 107 may be used by a person wishing to configure automatic appliance 101 (i.e., a registrant) to provide information. The configuration process may be enabled by accessing the web server portion of configuration server 114 via Internet 113 using an appropriate browser software to retrieve registration web page 108. Referring to FIG. 2, registration web page 108 includes input form 201 having input areas 202, 203, and 204 for the entry of appropriate configuration information. This configuration information may include, for example, information required to identify automatic appliance 101 sufficiently to enable subsequent communications with the appliance such as, for example, a serial number. Other configuration information may include identification of the ISP to be used by automatic appliance 101 in establishing connectivity to the Internet such as the IP address of the ISP. Still other configuration information may include account information of the user or registrant as previously described. Upon entering the configuration information into the web browser and selecting the appropriate submit button, the configuration information may be transmitted to web server portion of configuration server 114 to be made available to automatic appliance 101.

Referring again to FIG. 1, automatic appliance 101 may be placed in an initialization mode causing it to enable an internal dial-up modem. Automatic appliance 101 dials out to a pre-stored or a user-designated "1(800)" telephone number provided by an operator of configuration server 114 to provide access via telephone line or trunks 118 or interface 119 to the configuration server. Upon establishing communications with configuration server 114 over telephone lines 118 or 119, automatic appliance 101 provides its serial number to configuration server 114. In response, configuration server 114 accesses the appropriate configuration information stored in configuration database 120 and provides this information via its direct-dial interface to automatic appliance 101. Automatic appliance 101 stores and acknowledges successful receipt of the configuration information to configuration server 114, which then erases the information from configuration database 120 to avoid potential information privacy issues caused by retention of such information. Automatic appliance 101 uses the configuration information to configure the appropriate software, including web browser settings, modem parameters, etc. to provide access to the registrant's designated ISP 112 and the resources of Internet 113. As previously mentioned, these Internet resources may include access to music recognition service web server 125 and music recognition database 126, web radio sites (not shown), music downloads and other databases, services, etc. In addition, Internet 113 may provide peer-to-peer transfer of information files between similar automatic appliances 101. For example, the web server portion of configuration server 114, or another dedicated web server such as web server 123, may be used to periodically update software resident in automatic appliance 101.

A method of configuring an automatic appliance may be depicted in the flowchart of FIG. 3. The method avoids direct entry of substantial amounts of configuration information into the automatic appliance that typically has only limited capabilities for the input of such information. Instead, the method enables use of a user friendly input device such as a PC for the entry of configuration information, accessing of the Internet, and uploading of the configuration information to a remote server. The automatic appliance operating in an initialization mode subsequently accesses the remote server using, for example, a preprogrammed 800-telephone number and downloads the configuration information. Using the remote server as an intermediary enables use of typical PC input devices (e.g., keyboard, pointing device, etc.) to input the configuration information without requiring a direct interface to the automatic appliance. The method may be particularly applicable where a substantial amount of information must be provided by the user, the entry of which would otherwise require manual input of the information directly into the automatic appliance.

Starting at step 301, a user or registrant logs into the Internet at step 302 and, at step 303 accesses a device configuration server. In response, the device configuration server provides a web page including an input form for the user to use to submit appropriate configuration information to accomplish the registration. In cases where the registrant may be using a PC sharing a telephone line with the automatic appliance, an appropriate message may be generated after the registrant has completed the form at step 305 instructing the registrant to log-off the Internet if required to provide telephone access to the automatic appliance.

At step 306 the automatic appliance may be activated in an appropriate initialization mode by the user/registrant and, at step 307 automatically dials out to the configuration server using a dial-up telephone line of a switched telephone network such as the PSTN. Dialing may be performed using standard telephone signaling protocols to provide dialing information, e.g., Dual-Tone-Multi-Frequency (DTMF), pulse dialing, ISDN out-of-band signaling, etc. At step 308 direct communications may be established with the configuration server and, at step 309, the configuration information previously uploaded by the registrant may be downloaded to the automatic appliance. Upon confirmation that the download was successful at step 310, the automatic appliance disconnects from the configuration server at 311 and the configuration server erases the local store of configuration information specific to the registrant. Step 313 may be included to transmit user product registration to a customer database maintained by the manufacturer of the automatic appliance. At step 314 the automatic appliance uses the configuration information to automatically configure itself, e.g., enable any required interfaces, establish access parameters, passwords, account numbers, etc. A connection may be established to a packet switching network such as the Internet by the automatic appliance at step 315 using the downloaded configuration information received from the configuration server. At step 316 an indication may be displayed that the Internet connection has been successfully made, the process terminating at step 317.

The invention as herein described enables a user of a device to provide configuration information using a separate or remote terminal such as a PC or a Personal Digital Assistant (PDA) in combination with a configuration server according to an embodiment of the invention. The invention may be further usable to provide other information and data that might be difficult to input using the limited facilities available on the automatic appliance, e.g., via a limited remote control device. For example, manually-input play list information may be entered using a PC, uploaded to an appropriate server where it may be stored for a later download to the automatic appliance.

While a programmable DEC has been used for purposes of illustration in connection with description of an automatic appliance compatible with an embodiment of the invention described, the invention may be equally applicable to other forms of appliances, including, for example, Internet appliances and even household appliances having microprocessors requiring Internet access, digital cameras, video cameras, Global Positioning System (GPS) receivers, and PDAs. All these appliances typically have limited or no integral means for the entry of configuration data required to provide such Internet access. Accordingly, such appliances may likewise incorporate an initialization mode of operation to automatically dial out to, for example, an 800-number to obtain dial-up access to a configuration server on which the user has previously stored appropriate configuration data. This configuration data may then be downloaded to the appliance over a direct dial-up interface to the configuration server, stored in memory of the device and used to then establish access to an appropriate ISP and the Internet.

What is claimed is:

1. A configuration server comprising:
   a web server connected to an Internet and hosting a registration webpage accessible to a registrant on said Internet, said registration webpage including an input area receiving configuration information from said registrant;
   a configuration database connected to said web server for storing said configuration information; and
   a direct-dial interface connected to a telephone line and to said configuration database, said direct-dial interface operational to answer an incoming telephone call from an automatic appliance, wherein said automatic appliance initiates said incomina telephone call to said direct-dial interface, and, in response, transmit said configuration information to said automatic appliance.

2. The configuration server according to claim 1 wherein said configuration database automatically erases said configuration information in response to a successful transmission of said configuration information to said remote device on said telephone line.

3. The configuration server according to claim 1 wherein said configuration information includes information required by said remote device to access said Internet.

4. The configuration server according to claim 1 wherein said configuration information includes ISP and user account information.

5. The configuration server according to claim 1 wherein said input area comprises an input form including areas designated for allowing a user to input information required for said remote device to gain access and connect to said Internet.

6. The configuration server according to claim 1 further comprising a registration database, said registration page further including an input area for receiving registration information form said registrant, said registration information including a name and an address of said registrant.

7. The configuration server according to claim 1 wherein said direct-dial interface includes a modem compliant with modulation, data transfer, and data compression protocols standards set by an organization selected from a group consisting of Bell, CCITT, ITU-T and CCJTT/ITU-T.

8. The configuration server according to claim 1 wherein said web server is configured to authenticate portions of said configuration information corresponding to identification information of said remote device, said identification information including a serial number.

9. An automatic appliance configuration registration system comprising:
   (a) an automatic appliance including a memory for storing configuration information for automatically configuring said automatic appliance; and
   (b) a remote configuration server interface operational to answer an incoming call from said automatic appliance, wherein said automatic appliance initiates said incoming call to said remote configuration server interface, and, in response, transmit said configuration information to said automatic appliance, said remote configuration server comprising
      (i) a web server connected to an Internet and hosting a registration webpage accessible to a registrant on said Internet, said registration webpage including an input area receiving said configuration information from said registrant; and
      (ii) a configuration database connected to said web server for storing said configuration information.

10. The automatic appliance configuration registration system according to claim 9, said remote configuration server further comprising (iii) a communication interface connected to a telephone line and to said configuration database for answering said incoming call from said automatic appliance.

11. The automatic appliance configuration registration system according to claim 9, said automatic appliance further including a modem operable in (1) an initialization mode for establishing communications with said remote configuration server and (2) an operational mode for establishing communications with an internet service provider.

12. The automatic appliance configuration registration system according to claim 9 wherein said communications interface comprises a dial-up modem connected to a telephone line.

13. The automatic appliance configuration registration system according to claim 9 wherein said automatic appliance further comprises a device selected from the group comprising a programmable digital entertainment center, digital camera, video camera, global positioning system receiver, personal digital assistant, Internet appliance and a household appliance.

14. The automatic appliance configuration registration system according to claim 9 wherein said automatic appliance further comprises an interface to a television monitor and an integral alphanumeric display.

15. The automatic appliance configuration registration system according to claim 9 wherein said automatic appliance further comprises (i) a compact disc (CD) player configured to play audio encoded using a pulse code modulation (PCM) technique and (ii) a digital music decoder configured to play audio encoded using a perceptual coding technique.

16. The automatic appliance configuration registration system according to claim 9 further comprising a computer comprising a web browser configured to access said registration webpage on said Internet.

17. A method of configuring an automatic appliance comprising the steps of:
   receiving configuration information from a client;
   storing said configuration information in a memory;
   accessing said memory with said automatic appliance operating in an initialization mode;
   downloading said configuration information from said memory to said automatic appliance operating in said initialization mode;
   automatically configuring a communications interface of said automatic appliance with said configuration information; and
   connecting to a remote server with said communications interface, said automatic appliance initiating said connection to said remote server.

18. The method of configuring an automatic appliance according to claim 17 further comprising transmitting a registration webpage to said client.

19. The method of configuring an automatic appliance according to claim 17 wherein said step of access said memory includes connecting to a dial-up telephone line and dialing a telephone number of a configuration server.

20. The method of configuring an automatic appliance according to claim 17, further comprising a step of automatically erasing said configuration information from said memory.

21. The method of configuring an automatic appliance according to claim 17 further comprising the steps of receiving user registration information from said client and transmitting said user registration information to a user registration database.

22. The method of configuring an automatic appliance according to claim 17 wherein said step of receiving configuration information from said client comprises receiving automatic appliance identification information and Internet access information including a user account number.

23. The method of configuring an automatic appliance according to claim 17 wherein said step of connecting to said remote server with said communications interface comprises accessing a music recognition service and downloading information about music stored by said automatic appliance.

24. The method of configuring an automatic appliance according to claim 17 further comprising the step of inputting said configuration information to said client using a personal computer.

25. The method of configuring an automatic appliance according to claim 17 wherein said step of receiving includes a step of accessing an Internet site using a personal computer.

* * * * *